United States Patent [19]

Reeh et al.

[11] 4,365,052

[45] Dec. 21, 1982

[54] METHOD FOR THE PREPARATION OF TRANSPARENT CASTING RESINS

[75] Inventors: Ulrike Reeh, Munich; Hans Denk, Gauting, both of Fed. Rep. of Germany

[73] Assignee: Siemens Aktiengesellschaft, Munich, Fed. Rep. of Germany

[21] Appl. No.: 254,607

[22] Filed: Apr. 16, 1981

[30] Foreign Application Priority Data

Apr. 25, 1980 [DE] Fed. Rep. of Germany ....... 3016103

[51] Int. Cl.³ ............................................ C08G 59/68
[52] U.S. Cl. ...................................... 528/92; 528/89; 528/115; 523/451
[58] Field of Search ......... 260/18 EP, 31.8 E, 30.6 R; 528/89, 92, 115

[56] References Cited

U.S. PATENT DOCUMENTS

| | | | |
|---|---|---|---|
| 3,477,971 | 11/1969 | Allen et al. | 528/92 X |
| 3,544,827 | 12/1970 | Witterick | 313/108 |
| 4,013,987 | 3/1977 | Foster | 528/92 X |
| 4,178,274 | 12/1979 | Denk et al. | 528/361 X |

Primary Examiner—Earl A. Nielsen
Attorney, Agent, or Firm—Kenyon & Kenyon

[57] ABSTRACT

The invention relates to a method for the manufacture of transparent casting resins. According to the invention, a liquid acid anhydride (b) is admixed to a premixture (a), which is liquid at room temperature, of zinc octoate, a low-molecular weight acid ester and, optionally, an organic phosphite, and this mixture of (a) and (b) is added, preferably at temperatures $\leq 50°$ C., to liquid aromatic diglycidyl ethers. Diphenyldecyl phosphite is particularly well suited as an organic phosphite. The casting resins obtained are transparent and find use particularly for casting-in and encapsulating opto-electronic components such as light-emitting diodes (and diode displays), photo diodes and photo transistors.

5 Claims, No Drawings

METHOD FOR THE PREPARATION OF TRANSPARENT CASTING RESINS

BACKGROUND OF THE INVENTION

The present invention relates to a method for preparing transparent casting resins, prepared from aromatic diglycidyl ethers, carboxylic-acid anhydrides, metal salts of carboxylic acids and auxiliary agents and additives. The compounds are suitable particularly for the encapsulation of opto-electronic components.

It is known to use epoxy casting resins with a bisphenol A base which can be hardened with acid anhydride (DE-OS No. 1 589 264) for covering or encapsulating electronic components. A disadvantage of the known epoxy resin compounds of the bisphenol A/acid anhydride type, which are prepared using customary reaction accelerators such as tertiary amines, $BF_3$-amine complexes or other amine-containing compounds, is the relatively long setting time needed before components cast therewith can be removed from the mold. On the other hand, these amine-containing accelerators lead in a short time to a yellowish appearance of the molded materials at temperatures above 80° C.

Casting resin compounds with a cycloaliphatic base which can be hardened by acid anhydrides for casting opto-electronic components also are known (DE-OS No. 2 642 465). While these resin compounds do not exhibit the disadvantages mentioned above in connection with the aromatic diglycidyl-ether resins, their mechanical properties are substantially poorer. Thus, they exhibit lower impact resistance and bending strength as well as insufficient adhesion to substrates. This brittleness has a particularly adverse effect on the temperature shock stress, tensile, impact and compression behavior of cast opto-electronic components. In some opto-electronic components, molded substances of such hardness influence the operation of sensitive chips, for example, by generating mechanical stresses.

SUMMARY OF THE INVENTION

It is the object of the present invention to prepare casting resin compounds which can be worked at room temperature for an extended period of time and set fast at elevated temperature.

Another object of the invention is to produce from such compounds mechanically high-quality moldings with good adhesion which, in temperature applications of opto-electronic components, show no appreciable reduction of the light transmittancy by becoming yellow or discolored when exposed to 120° C. for at least ½ year.

According to the present invention, these and other objects are achieved by admixing liquid acid anhydride to a premixture comprised of zinc octoate, a low-molecular acid ester and, optionally, an organic phosphite (which premixture is liquid at room temperature), and by adding the resultant mixture to liquid aromatic diglycidyl ethers.

It is a particular advantage of the method according to the present invention that casting resin premixtures are prepared which are liquid at room temperature and can also be processed at room temperature. For these reasons, the preparation of the casting resin compounds from the casting resin premixtures (transfer into the storage containers, dosing and mixing) and their processing (apportioning and pouring) can be carried out by simple technical means. The long use life of the liquid reaction resin mixture is particularly advantageous for producing a uniformly high quality of the components because there is no appreciable change of the viscosity during the processing. On the other hand, the quick setting at elevated temperature provides great advantages economically for the production of cast-in components in large quantities because of the short residence time required before removal of the component from the mold.

To carry out the method according to the present invention, zinc octoate and diphenyldecyl phosphite are mixed with a liquid low-molecular weight acid ester. Into this mixture is stirred the hardening agent hexahydrophthalic-acid anhydride which is melted at 80° C. After cooling down, a mixture is obtained which is highly liquid at room temperature (about 200 mPs). This sequence must be observed as indicated because otherwise, no clear, lasting solution is obtained.

Surprisingly, it was found that the hardener-accelerator mixture used in DE-OS No. 2 642 465, consisting of hexahydrophthalic-acid anhydride, hexahydrophthalic-acid monoethyl ester, diphenyldecyl phosphite and zinc octoate, yields fast-setting casting compounds and thermally highly stable cast-resin moldings with good mechanical properties if diglycidyl ethers of bisphenol A or bisphenol F or mixtures are used as the resin base. As further acid esters acting as solubilizers for zinc octoate, other short-chain acid esters, obtained from glycols and acid anhdyride, for example, prepared from 1 mol ethylene glycol and 2 mol hexahydrophthalic-acid anhydride of the formula

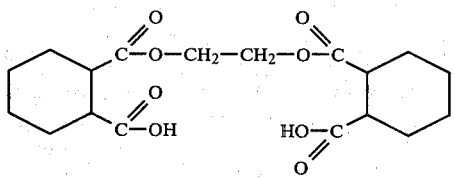

can be used. While customary accelerators for hardening aromatic diglycidyl ethers, such as tertiary amines, or $BF_3$-amine complexes, yield moldings which easily become yellow when thermally aged, moldings which retain their transparency at temperatures of up to 120° C. for at least ½ year are obtained if zinc octoate is used as the accelerator. This is surprising because to date the opinion generally has prevailed that such a degree of light genuineness is unattainable so long as substantial portions of conjugate aromatic systems are present.

A hardening agent which is particularly suitable for carrying out the method according to the present invention is hexahydrophthalic-acid anhydride (melting point = 65° C.). With other acid anhdyrides which are liquid at room temperature, such as methylhexahydrophthalic-acid anhydride or methylnadicanhydride or eutectic mixtures of other acid anhydrides which are liquid at room temperature, yellow discoloration of the premixture easily takes place during storage.

Diphenyldecyl phosphite has been found to be a particularly suitable organic phosphite. It acts as an oxidation stabilizer and is soluble in a mixture of zinc octoate and acid ester without problem at room temperature. Suitable aromatic liquid diglycidyl ethers are those with a bisphenol A and bisphenol F base and their mixtures.

The casting compounds obtained with the method according to the invention can be used for coating or encapsulating opto-electronic components such as light-emitting diodes, photo diodes, photo transistors, and for casting light-emitting diode displays.

DETAILED DESCRIPTION OF THE INVENTION

The invention is explained in further detail by means of the following illustrative examples:

EXAMPLE 1

Preparation of the Premixture (Component A)

100 parts by weight diglycidyl ether of bisphenol A with an epoxy value of 0.57±0.01 mol/100 g are heated to 60° C. and 0.00015 parts by weight of the optical brightener Waxoline Violet A ® are stirred-in at this temperature. Before mixing with component B below, the mixture is cooled down to room temperature.

Preparation of the Casting Resin Premixture (Component B)

16 parts by weight of the acid ester, hexahydrophthalic-acid monoethyl ester (if crystallized, it is melted at 35° to 40° C.) are mixed homogeneously with 6 parts by weight zinc octoate and 7 parts by weight diphenyldecyl phosphite at room temperature. Into this mixture are stirred 71 parts by weight of the hardening agent hexahydrophthalic-acid anhydride which is melted at 80° C. This mixture is cooled down to room temperature.

Preparation of the Reactive Casting Resin Compound 100 parts by weight of component A are homogeneously mixed at room temperature with 100 parts by weight of component B and, if indicated, vented.

This ready-to-use reactive resin mixture has a very long use life and shows essentially no increase of the flow viscosity after 8 hours at room temperature.

Property data of the casting resin compound and the molded material can be seen from the Table.

EXAMPLE 2

Preparation of the Casting Resin Premixture (Component A)

100 parts by weight of the bisphenol F diglycidyl ether with an epoxy value of 0.60±0.01 mol/100 g are heated to 60° C., and 0.00015 parts by weight of the optical brightener Waxoline Violet A ® are stirred-in at this temperature. The mixture is cooled down to room temperature before it is mixed with component B.

Preparation of the Casting Resin Premixture (Component B)

17 parts by weight of the acid ester, hexahydrophthalic-acid monoethyl ester (if crystallized, it is melted at 35° to 40° C.) are homogeneously mixed at room temperature with 6 parts by weight zinc octoate and 7 parts by weight diphenyldecyl phosphite. Into this mixture, 75 parts by weight of the hexahydrophthalic-acid anhydride, melted at 80° C., are stirred. This mixture is cooled down to room temperature.

Preparation of the Reactive Casting Resin Compound 100 parts by weight of component A are mixed homogeneously with 105 parts by weight of component B at room temperature and are vented, if indicated.

The ready-to-use resin mixture has a very long use life and shows essentially no increase of the flow viscosity after 8 hours at room temperature.

The property data of the casting resin compound and the molded material may be seen from the Table.

EXAMPLE 3

Preparation of the Casting Resin Premixture (Component A)

100 parts by weight of the diglycidyl ether of bisphenol A with an epoxy value of 0.57±0.01 mol/100 g are heated to 60° C. and 0.00015 parts by weight of the optical brightener Waxoline Violet A ® are stirred-in at this temperature. This mixture is cooled down to room temperature before it is mixed with component B.

Preparation of the Casting Resin Premixture (Component B)

15 parts by weight of the acid ester, prepared from 1 mol ethylene glycol and 2 mol hexahydrophthalic-acid anhydride (the crystallized ester is melted at 100° C.) are mixed homogeneously with 6 parts by weight zinc octoate and 7 parts by weight diphenyldecyl phosphite at 40° to 60° C. Into this mixture are stirred 72 parts by weight of the hardening agent hexahydrophthalic-acid anhydride melted at 80° C. This mixture is cooled down to room temperature.

Preparation of the Reactive Casting Resin Compound 100 parts by weight of component A are mixed homogeneously with 100 parts by weight of component B at room temperature and, if indicated, vented.

This already-to-use reactive resin mixture has a very long use life and shows essentially no increase of the flow viscosity after 8 hours at room temperature.

The property data of the casting resin compound and the molded material may be seen from the Table.

EXAMPLE 4

Preparation of the Casting Resin Premixture (Component A)

100 parts by weight of the diglycidyl ether of bisphenol A with an epoxy value of 0.57±0.01 mol/100 g are heated to 60° C., and 0.00015 parts by weight of the optical brightener Waxoline Violet A are stirred in at this temperature. This mixture is cooled down to room temperature before it is mixed with component B.

Preparation of the Casting Resin Premixture (Component B)

11 parts by weight of the acid ester, prepared from 1 mol 1,2-propane diol and 2 mol hexahydrophthalic-acid anhydride (the crystallized ester is melted at 100° to 120° C.) are mixed homogeneously with 6 parts by weight zinc octoate and 7 parts by weight diphenyldecyl phosphite at 60° to 80° C. Into this mixture are stirred 76 parts by weight of the hardening agent hexahydrophthalic-acid anhydride, melted at 80° C. This mixture is cooled down to room temperature.

Preparation of the Reactive Casting Resin Compound 100 parts by weight of component A are mixed homogeneously with 100 parts by weight of component B and, if indicated, are vented.

This ready-to-use reactive resin mixture has a very long use life and shows essentially no increase of the flow viscosity after being stored for 8 hours at room temperature.

The property data of the casting resin compound and the molded material may be seen from the Table.

EXAMPLE 5

Preparation of the Premixture (Component A)

100 parts by weight of the diglycidyl ether of bisphenol A with an epoxy value of 0.57±0.01 mol/100 g are heated to 60° C. and 0.00015 parts by weight of the optical brightener Waxoline Violet A ® are stirred-in at this temperature. The mixture is cooled down to room temperature before it is mixed with component B.

Preparation of the Casting Resin Premixture (Component B)

16 parts by weight of the acid ester hexahydrophthalic-acid monoethyl ester (if crystallized, it is melted at 35° to 40° C.) are mixed homogeneously at room temperature with 6 parts by weight zinc octoate. Into this mixture are stirred 71 parts by weight of the hardening agent hexahydrophthalic-acid anhydride melted at 80° C. This mixture is cooled down to room temperature.

Preparation of the Reactive Casting Resin Compound 100 parts by weight of component A are mixed with 93 parts by weight of component B homogeneously at room temperature and, if indicated, vented.

The ready-to-use reactive resin mixture has a very long use life and shows essentially no increase of the flow viscosity after 8 hours at room temperature.

Property values of the casting resin compound and the molded material can be seen from the Table.

The data given in the Table are taken from the conditions which are obtained when casting-in light-emitting diodes of the 5-mm type, cast in steel molds. The mixture was prepared at room temperature, the resin was dosed into the steel cavities which were heated to 150° C. and removed from the mold after 5 to 7 minutes. Full hardening of the loose material took place for 4 hours at 150° C.

Martens temperature, bending strength, impact strength and bending angle were determined in parallel with the cast-in component on standard rods and Dynstatt samples, respectively.

EXAMPLE 6

Preparation of the Casting Resin Premixture (Component A)

100 parts by weight of the diglycidyl ether of bisphenol A with an epoxy value of 0.57±0.01 mol/100 g are heated to 60° C. and 0.00015 parts by weight Waxoline Violet A ® are stirred-in at this temperature. This mixture is cooled down to room temperature before it is mixed with component B.

Preparation of the Casting Resin Premixture (Component B)

18 parts by weight of the acid ester, prepared from 1 mol 3-methylpentane diol -1,5 and 2 mol hexahydrophthalic-acid anhydride (the ester is melted at 80° C.) are mixed with 6 parts by weight zinc octoate and 7 parts by weight diphenyldecyl phosphite at 60° C. Into this mixture are stirred 72 parts by weight of the hardening agent hexahydrophthalic-acid anhydride, melted at 80° C. For better mixing, this mixture is held at 40° C.±5° C.

Preparation of the Casting Resin Compound 100 parts by weight of component A are homogeneously mixed with 103 parts by weight of component B (40° C.±5° C.) and, if indicated, vented.

EXAMPLE 7

Casting Resin Premixture (Component A)

Diglycidyl ether of bisphenol A with an epoxy value of 0.57±0.01 mol/100 g.

Preparation of the Casting Resin Premixture (Component B)

19 parts by weight of the acid ester prepared from 1 mol 3-methylpentane diol -1,5 and 2 mol methylhexahydrophthalic-acid anhydride (the ester is melted at 90° C.) are mixed at 60° C. with 6 parts by weight zinc octoate and 7 parts by weight diphenyldecyl phosphite. Into this mixture are stirred 79 parts by weight of the hardening agent methylhexahydrophthalic-acid anhydride, which is liquid at room temperature. For better mixing, this mixture is held at 40° C.±5° C.

Preparation of the Casting Resin Compound 100 parts by weight of component A are homogeneously mixed with 111 parts by weight of component B (40° C.±5° C.) and, if indicated, vented.

TABLE

| CASTING RESIN | GELLING TIME AT 150° C. (Min; Seconds) | MARTENS-TEMP. °C. | BENDING STRENGTH N/mm² | IMPACT STRENGTH Nmm/mm² | BENDING ANGLE < > = WITHOUT BREAK |
| --- | --- | --- | --- | --- | --- |
| Example 1: | 2'10" | 84 | 141 | 12 | <21°> |
| Example 2: | 2'00" | 75 | 146 | 15 | <22°> |
| Example 3: | 2'05" | 84 | 138 | 12 | <21°> |
| Example 4: | 2'00" | 100 | 141 | 12 | <19°> |
| Example 5: | 2'10" | 86 | 138 | 11 | <19°> |
| Example 6: | 2'00" | 84 | 147 | 10 | <26°> |
| Example 7: | 1'55" | 91 | 147 | 9 | <25°> |
| Example 8: | 1'55" | 55 | 130 | 10 | <24°> |

EXAMPLE 8

Casting Resin Premixture (Component A)

Diglycidyl ether of bisphenol A with an epoxy value of 0.57±0.01 mol/100 g.

Preparation of the Casting Resin Premixture (Component B)

43 parts by weight of the acid ester, prepared from 1 mol castor oil and 3 mol hexahydrophthalic-acid anhydride are mixed with 6 parts by weight zinc octoate and 7 parts by weight diphenyldecyl phosphite at 60° C. Into this mixture are stirred 72 parts by weight of the hardening agent hexahydrophthalic-acid anhydride, melted at 80° C. For better mixing, this mixture is held at 40° C.±5° C.

Preparation of the Casting Resin Compound 100 parts by weight of component A are homogeneously mixed with 128 parts by weight of component B (40° C.±5° C.) and, if indicated, vented.

What is claimed is:

1. A method for the manufacture of transparent casting resins prepared from aromatic diglycidyl ethers, carboxylic acid anhydrides, metal salts of carboxylic acids and auxiliary agents and additives, comprising forming an admixture of (a) a premixture comprising zinc octoate and a low-molecular weight acid ester, which premixture is liquid at room temperature, and (b) a liquid acid anhydride, and adding said admixture to a liquid aromatic diglycidyl ether.

2. The method according to claim 1 wherein said premixture (a) further comprises an organic phosphite.

3. The method according to claim 2 wherein said admixture of (a) and (b) is added at temperatures ≦50° C. to a liquid aromatic diglycidyl ether.

4. The method according to claim 2 wherein said organic phosphite is diphenyldecyl phosphite.

5. The method according to claim 1 wherein said low molecular weight acid ester comprises a low-molecular acid ester of the formula

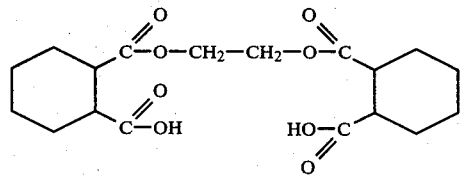

* * * * *